United States Patent
Wang (10) Patent No.: US 10,567,547 B2
(45) Date of Patent: Feb. 18, 2020

(54) METHOD OF TWO-WAY INFORMATION EXCHANGE FOR A SYSTEM FOR MAKING FRIENDS WHICH DISPLAY A PRIMARY TARGET CLIENT AND A PLURALITY OF FALSE TARGET CLIENTS AND GRANTS A REQUESTING CLIENT THE ABILITY TO DELETE AT LEAST ONE OF A PLURALITY OF FALSE TARGET CLIENTS BASED ON A THRESHOLD OF TIME

(71) Applicant: Yi-Chen Wang, New Taipei (TW)

(72) Inventor: Yi-Chen Wang, New Taipei (TW)

(*) Notice: Subject to any disclaimer, the term of this patent is extended or adjusted under 35 U.S.C. 154(b) by 344 days.

(21) Appl. No.: 15/589,378

(22) Filed: May 8, 2017

(65) Prior Publication Data

US 2018/0020079 A1    Jan. 18, 2018

(30) Foreign Application Priority Data

Jul. 15, 2016   (TW) .............................. 105122498 A (51) Int. Cl.
   *H04L 29/08* (2006.01)
   *H04L 12/58* (2006.01)
   *H04L 29/06* (2006.01)

(52) U.S. Cl.
   CPC .............. *H04L 67/32* (2013.01); *H04L 51/00* (2013.01); *H04L 51/12* (2013.01); *H04L 67/2809* (2013.01); *H04L 67/42* (2013.01); *H04L 51/14* (2013.01); *H04L 51/32* (2013.01)

(58) Field of Classification Search
   CPC ..... H04L 67/32; H04L 67/2809; H04L 67/42; H04L 51/00; H04L 51/12; H04L 51/14; H04L 51/32
   See application file for complete search history.

(56) References Cited

U.S. PATENT DOCUMENTS

| | | | | |
|---|---|---|---|---|
| 4,173,016 A | * | 10/1979 | Dickson | G01S 13/74 340/10.1 |
| 5,086,394 A | * | 2/1992 | Shapira | G01S 13/74 340/407.2 |
| 5,963,951 A | * | 10/1999 | Collins | G06Q 10/10 |
| 6,052,122 A | * | 4/2000 | Sutcliffe | G06Q 30/02 707/999.003 |
| 6,061,681 A | * | 5/2000 | Collins | G06Q 30/08 |
| 6,073,105 A | * | 6/2000 | Sutcliffe | G06Q 30/02 235/375 |
| 6,256,503 B1 | * | 7/2001 | Stephens | H04W 4/021 455/415 |

(Continued)

*Primary Examiner* — Daniel C. Murray
(74) *Attorney, Agent, or Firm* — Wang Law Firm, Inc.

(57) ABSTRACT

A method of two-way information exchange for a system for making friends is disclosed. With the method, a system can provide a primary target client blended with a plurality of false target clients for a requesting client who seeks making friends. The requesting client is entitled to request the system to delete one of the target clients when communication between both parties reaches a threshold of time. The requesting client does not know which one of the target clients is the real client until all of the false target clients have been deleted, thus reducing preconceptions due to a person's appearance. As such, after a period of communication, both parties may achieve a certain degree of mutual understanding to facilitate a decision on making friends.

8 Claims, 6 Drawing Sheets

(56) References Cited

U.S. PATENT DOCUMENTS

| | | | | |
|---|---|---|---|---|
| 6,549,768 B1* | 4/2003 | Fraccaroli | H04L 51/20 | 455/445 |
| 6,735,568 B1* | 5/2004 | Buckwalter | G06Q 30/02 | 705/319 |
| 7,055,103 B2* | 5/2006 | Lif | G06Q 10/02 | 382/118 |
| 7,085,806 B1* | 8/2006 | Shapira | G06Q 30/08 | 705/1.1 |
| 7,092,914 B1* | 8/2006 | Shear | G06Q 20/3674 | 705/67 |
| 7,092,952 B1* | 8/2006 | Wilens | G06Q 30/02 | |
| 7,203,674 B2* | 4/2007 | Cohen | G06Q 10/02 | |
| 7,401,098 B2* | 7/2008 | Baker | H04L 12/1818 | |
| 7,592,910 B2* | 9/2009 | Tuck | C11D 3/50 | 340/326 |
| 7,599,802 B2* | 10/2009 | Harwood | G06Q 50/10 | 702/20 |
| 7,613,706 B2* | 11/2009 | Terrill | G06Q 30/08 | |
| 7,676,466 B2* | 3/2010 | Terrill | G06Q 50/01 | 707/999.006 |
| 7,677,970 B2* | 3/2010 | O'Kelley, II | A63F 13/795 | 463/23 |
| 7,702,685 B2* | 4/2010 | Shrufi | G06Q 10/10 | 707/760 |
| 7,752,054 B1* | 7/2010 | Anthony-Hoppe | G06Q 10/10 | 705/1.1 |
| 7,761,386 B2* | 7/2010 | Teicher | G06F 16/9535 | 705/319 |
| 7,818,420 B1* | 10/2010 | Taylor | G06Q 10/00 | 709/207 |
| 7,856,360 B2* | 12/2010 | Kramer | G06Q 30/02 | 705/1.1 |
| 7,882,039 B2* | 2/2011 | Weiss | G06Q 30/02 | 705/319 |
| 7,929,951 B2* | 4/2011 | Stevens | G06Q 20/04 | 455/414.1 |
| 7,949,611 B1* | 5/2011 | Nielsen | G06F 21/6245 | 705/319 |
| 7,958,117 B2* | 6/2011 | Pettinati | G06Q 50/10 | 705/319 |
| 7,970,390 B2* | 6/2011 | Fraccaroli | H04M 3/42008 | 455/414.1 |
| 7,970,712 B2* | 6/2011 | Ruvolo | G06Q 50/01 | 705/1.1 |
| 8,010,459 B2* | 8/2011 | Buyukkokten | G06Q 50/01 | 705/319 |
| 8,051,013 B2* | 11/2011 | Terrill | G06Q 10/1053 | 705/319 |
| 8,060,463 B1* | 11/2011 | Spiegel | G06Q 30/02 | 707/609 |
| 8,073,786 B2* | 12/2011 | Solari | G06Q 10/10 | 705/1.1 |
| 8,117,091 B2* | 2/2012 | Terrill | G06Q 30/06 | 705/26.1 |
| 8,195,668 B2* | 6/2012 | Drennan | G06Q 50/01 | 705/319 |
| 8,209,310 B1* | 6/2012 | Metcalfe | G06Q 30/0241 | 707/705 |
| 8,257,178 B2* | 9/2012 | Shibahara | A63F 13/12 | 463/42 |
| 8,473,490 B2* | 6/2013 | Bonilla | G06Q 50/22 | 707/732 |
| 8,554,794 B2* | 10/2013 | Brydon | G06Q 10/107 | 707/785 |
| 8,583,563 B1* | 11/2013 | Bonilla | G06Q 10/105 | 705/1.1 |
| 8,615,484 B2* | 12/2013 | Flinn | G06Q 50/01 | 707/603 |
| 8,719,354 B2* | 5/2014 | Granito | G06Q 10/107 | 455/412.1 |
| 8,775,324 B2* | 7/2014 | Zhu | G06Q 50/01 | 705/319 |
| 8,868,654 B2* | 10/2014 | Guha | G06Q 30/08 | 709/204 |
| 8,935,296 B2* | 1/2015 | Taylor | G06Q 30/02 | 707/802 |
| 9,064,262 B2* | 6/2015 | Ianni | G06Q 10/10 | |
| 9,298,826 B2* | 3/2016 | Coldicott | G06Q 10/10 | |
| 9,536,221 B2* | 1/2017 | Frind | G06Q 10/10 | |
| 9,537,706 B2* | 1/2017 | Frind | H04L 29/0818 | |
| 9,563,708 B2* | 2/2017 | Gang | G06F 16/9535 | |
| 9,652,114 B2* | 5/2017 | Piccionelli | G06F 3/04815 | |
| 9,672,289 B1* | 6/2017 | Frind | G06N 5/04 | |
| 9,984,386 B1* | 5/2018 | Bhatia | G06Q 30/0241 | |
| 9,992,648 B2* | 6/2018 | Pan | G06Q 30/02 | |
| 10,262,039 B1* | 4/2019 | Ramanathan | G06F 16/24575 | |
| 10,366,090 B2* | 7/2019 | Shorman | G06N 5/022 | |
| 2002/0160339 A1* | 10/2002 | King | G09B 19/00 | 434/106 |
| 2004/0010608 A1* | 1/2004 | Piccionelli | G06Q 10/10 | 709/229 |
| 2004/0148347 A1* | 7/2004 | Appelman | H04L 29/08684 | 709/204 |
| 2004/0260781 A1* | 12/2004 | Shostack | G06Q 30/02 | 709/207 |
| 2005/0171955 A1* | 8/2005 | Hull | G06Q 50/01 | |
| 2006/0059142 A1* | 3/2006 | Zvinyatskovsky | G06Q 30/08 | |
| 2006/0059159 A1* | 3/2006 | Truong | G06Q 10/10 | |
| 2006/0155566 A1* | 7/2006 | Berger | G06Q 30/02 | 705/319 |
| 2006/0242014 A1* | 10/2006 | Marshall | G06Q 10/00 | 705/319 |
| 2008/0086534 A1* | 4/2008 | Bardak | G06Q 30/02 | 709/206 |
| 2009/0024548 A1* | 1/2009 | Zhu | G06Q 50/01 | 706/21 |
| 2009/0094048 A1* | 4/2009 | Wallace | G06Q 30/02 | 705/319 |
| 2010/0070577 A1* | 3/2010 | Relyea | G06Q 10/10 | 709/204 |
| 2010/0185580 A1* | 7/2010 | Zhu | G06Q 20/06 | 706/52 |
| 2010/0262611 A1* | 10/2010 | Frind | G06Q 10/10 | 707/748 |
| 2011/0219310 A1* | 9/2011 | Robson | G06Q 10/06 | 715/733 |
| 2012/0059850 A1* | 3/2012 | Bent | G06Q 30/0269 | 707/776 |
| 2014/0156750 A1* | 6/2014 | De Cristofaro | G06Q 10/1095 | 709/204 |
| 2016/0132972 A1* | 5/2016 | Fetzer | G06Q 50/01 | 705/319 |
| 2019/0058683 A1* | 2/2019 | Morrison | H04L 51/32 | |
| 2019/0318520 A1* | 10/2019 | Fletcher | G06T 11/60 | |

* cited by examiner

METHOD OF TWO-WAY INFORMATION EXCHANGE FOR A SYSTEM FOR MAKING FRIENDS WHICH DISPLAY A PRIMARY TARGET CLIENT AND A PLURALITY OF FALSE TARGET CLIENTS AND GRANTS A REQUESTING CLIENT THE ABILITY TO DELETE AT LEAST ONE OF A PLURALITY OF FALSE TARGET CLIENTS BASED ON A THRESHOLD OF TIME

FIELD OF THE INVENTION

The present invention relates to a method of two-way information exchange for a system for making friends, whereby preconceptions due to a person's appearance can be reduced.

BACKGROUND OF THE INVENTION

With the advent of the internet, communication between people is not limited by residences. Everyone can immediately communicate with persons living in remote areas through the internet. Due to the trend and convenience of the internet, some internet software providers offer a platform, through which people can exchange their thoughts, so as to increase the internet traffic flow of the web site and gather a lot of information about the preferences and use habits of customers for getting commercial benefits.

Existing internet software require users to provide their photos. Since people tend to select a person by appearance, users may modify their photos for being accepted by their counterparts more easily. As a result, existing internet software cannot provide a fair platform for information exchange.

In some existing internet software, a screening mechanism is implemented by asking questions provided from a client who desires to make friends. If the answers from a person match with the standard of the client, the person may obtain the photo of the client for further information exchange. The screening mechanism is too simple and cannot afford a two-way communication. In addition, a person may figure out the thought of the client to give the answers expected by the client. Therefore, the client fails to know whether the counterpart is a true friend or not.

To prevent persons from being limited or even rejected due to their looks, the present invention provides a method of two-way information exchange for a system for making friends, which can provide a fair platform for information exchange. With the method of the present invention, a client allows access to the counterpart only after the communication between both parties has reached a threshold of time, so that people inclined to make friends by appearance can be reduced, thus alleviating the foregoing problem of the existing internet software.

SUMMARY OF THE INVENTION

One object of the present invention is to provide a method of two-way information exchange for intelligent communication devices, which allows a requesting client to be paired with a primary target client blended with a plurality of false target clients, so that the appearance of each client does not play an important role in making friends, and thus more fair information exchange can be achieved.

Another object of the present invention is to provide a method of two-way information exchange for intelligent communication devices, wherein communication between two clients has to reach a threshold of time to be granted with a delete privilege, so that the time and depth of the communication can be increased.

A further object of the present invention is to provide a system for conducting two-way information exchange through intelligent communication devices, whereby the time and depth of communication between both parties can be increased, and thus a fair platform for information exchange can be established.

The method of the present invention comprises: (a) the server receives a connection request and exchange conditions provided from a requesting client by way of an intelligent communication device; (b) the server searches a data storage device for at least one client (primary target client), who is online and meets the exchange conditions; (c) the server searches the data storage device for a plurality of clients (false target clients), who meet the exchange conditions as well; (d) the server connects the primary target client with the requesting client through the intelligent communication device to start a communication activity, and the server sends data of the primary target client and data of the false target clients to the intelligent communication device of the requesting client; (e) the server grants the requesting client a delete privilege when the requesting client communicating with the primary target client reaches a threshold of time; and (0 the server deletes at least one of the false target clients and then sends data of the remaining false target clients and data of the primary target client to the intelligent communication device of the requesting client when receiving a delete request from the requesting client.

Furthermore, for allowing clients to have more options, the method may be provided before step (a) with step (g): the server stores personal data provided from clients, including the requesting client, the primary target client and the false target clients, to the data storage device for registration; the step (e) of the method may further include: the server stores points unused by the requesting client to the data storage device, or the server further grants the requesting client one or more delete privileges corresponding to points unused by the requesting client; the step (e) of the method may further include: the server grants the requesting client a gift privilege; the method may be provided after step (f) with step (f1): the server receiving a request from the requesting client who seeks to continue communicating with the primary target client of step (b) after the communication activity is terminated; the method may be provided between step (e) and step (f) with step (i): the server grants the requesting client at least one replacement privilege, and the server replaces the primary target client with another client and re-executing step (e) when receiving a replacement request from the requesting client.

The system of the present invention may comprise at least one intelligent communication device and information exchange processing equipment. The intelligent communication device has at least one display screen. The information exchange processing equipment includes at least one data storage device, which can store data provided from a plurality of clients, and at least one server connected with the data storage device. The server can receive exchange conditions provided from the requesting client using the intelligent communication device. The server can search the data storage device for at least one client (primary target client), who is online and meets the exchange conditions, and can search the data storage device for a plurality of clients (false target clients), who meet the exchange conditions_as well. The server can connect the primary target client with the requesting client through the intelligent communication device of the requesting client. The server can send data of the primary target client and data of the false target clients to the intelligent communication device of the requesting client. The server grants the requesting client a delete privilege when the requesting client communicating with the primary target client reaches a threshold of time. The server deletes at least one of the false target clients and sends data of the remaining false target clients and data of the primary target client to the intelligent communication device of the requesting client when receiving a delete request from the requesting client. Also, the server may include a statistical unit capable of calculating the count of information exchange of the requesting client communicating with the primary target client, and the server can send a symbol corresponding to the count of information exchange to the intelligent communication device of the requesting client.

The system of the present invention can offer a fair platform for clients who want to conduct information exchange through intelligent communication devices. Since the server of the system can select a primary target client blended with a plurality of false target clients, the both parties may have a fair chance of conducting information exchange with each other without being subject to their looks. Furthermore, the server may grant the requesting client a delete privilege when the requesting client communicating with the primary target client reaches a threshold of time. The server can delete one of the false target clients when receiving a delete request from the requesting client. The requesting client does not know which one of the target clients is the real client until all of the false target clients have been deleted. This way of showing multiple clients simultaneously on the intelligent communication device can increase the time of communication between the two clients, and can replace the method of information exchange employed in existing internet software, so that more in-depth information exchange and sharing can be achieved, and true interpersonal relationship can be established.

BRIEF DESCRIPTION OF THE DRAWINGS

The foregoing and other features and advantages of illustrated embodiments of the present invention will be more readily apparent from the following detailed description, which proceeds with reference to the accompanying drawings.

DETAILED DESCRIPTION OF THE ILLUSTRATED EMBODIMENTS

The foregoing and other technical contents, features and advantages of the present invention will be illustrated in detail by way of exemplary embodiments with reference to the accompanying drawings. In the exemplary embodiments, same elements will be indicated by same numerals or labels.

In today's society, due to rapid technological development, intelligent communication devices, such as smartphones and tablet computers, can be used to search data on web promptly and play games, and particularly, with those communication devices, people can communicate with their friends or families around the world and share interesting things through the most interactive applications, such as Facebook or Line. Some internet application providers have developed application software for making friends, such as Pairs, i-Part, BeeTalk, and so on, so that persons engaged in talks via internet are not limited to their own circles of friends.

In using a commonly used internet application for dating or making friends, first of all, a user should register with a server of the application and upload his or her photos and personal information, and the user should provide the dating conditions to the server of the application after logging on the server. Next, the server of the application can search its database for persons who meet the dating conditions and; if a successful search is made, photos of the persons meeting the conditions can be sent to the smartphone of the user so that the user can select one person for communication. However, if the photos of the persons are not attractive, the user is likely to request the server of the application to replace them. Under this circumstance, the search result of the internet application is dominated by a person's appearance.

Figure 1:
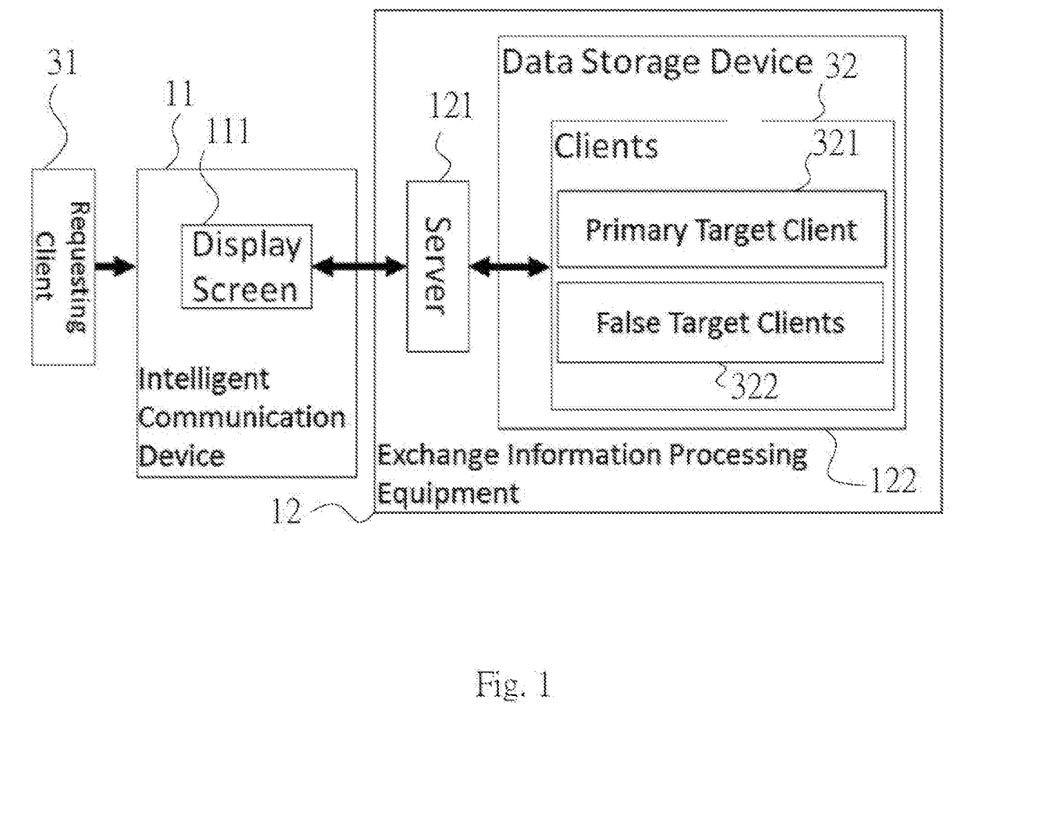
FIG. 1 shows a block diagram of a system which uses a method of two-way information exchange according to embodiments of the present invention.
Figure 2:
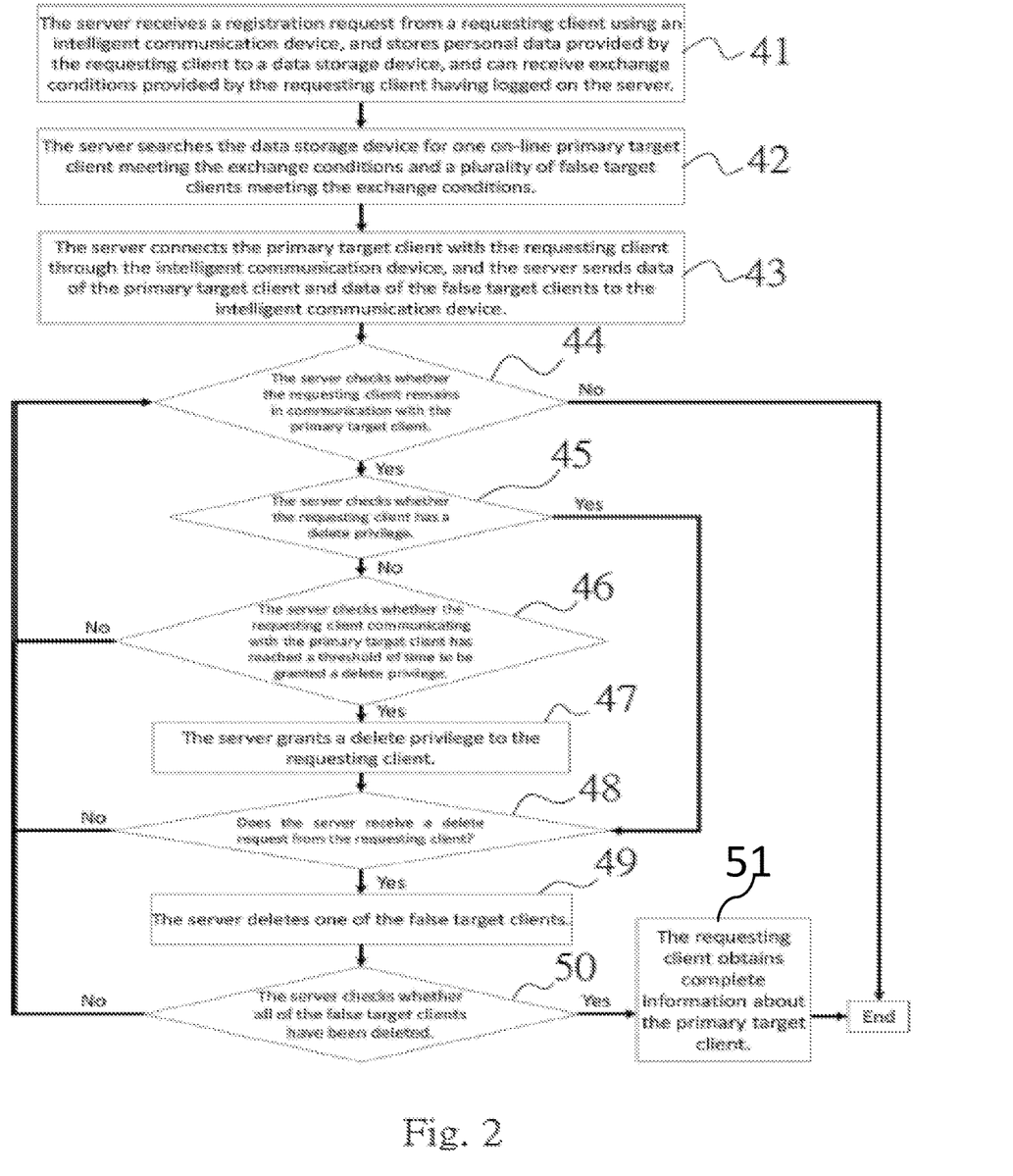
FIG. 2 shows a flowchart of the method according to a first embodiment of the present invention.

The present invention provides a solution to mitigate the disadvantages of the above existing applications. FIG. 1 shows a block diagram of a system for making friends, wherein users may download a specific application for their intelligent communication devices such as smartphones, desktop computers, laptop computers, tablet computers, and so on. For making use of the system, users have to register with a server 121 of the system and provide personal data to the server 121, which in turn stores the data to a storage device 122 connected therewith, so that the users are recognized as clients, wherein a client initializing a process of making friends on the system is referred to herein as a requesting client 31; a number of clients searched by the server 121 in response to the requesting client 31 are referred herein as target clients, including a primary or true target client 321, and one or more false target clients 322. FIG. 2 shows a flowchart of a method according to a first embodiment of the present invention, which illustrates specific steps to achieve the objects of the present invention. In step 41, the requesting client 31 should register with the server 121 of the information exchange processing equipment 12, wherein personal data can be stored to the data storage device 122, and then the requesting client 31 can provide the server 121 with exchange conditions, such as gender, age class or other conditions, after logging on the server 121.

Figure 3:
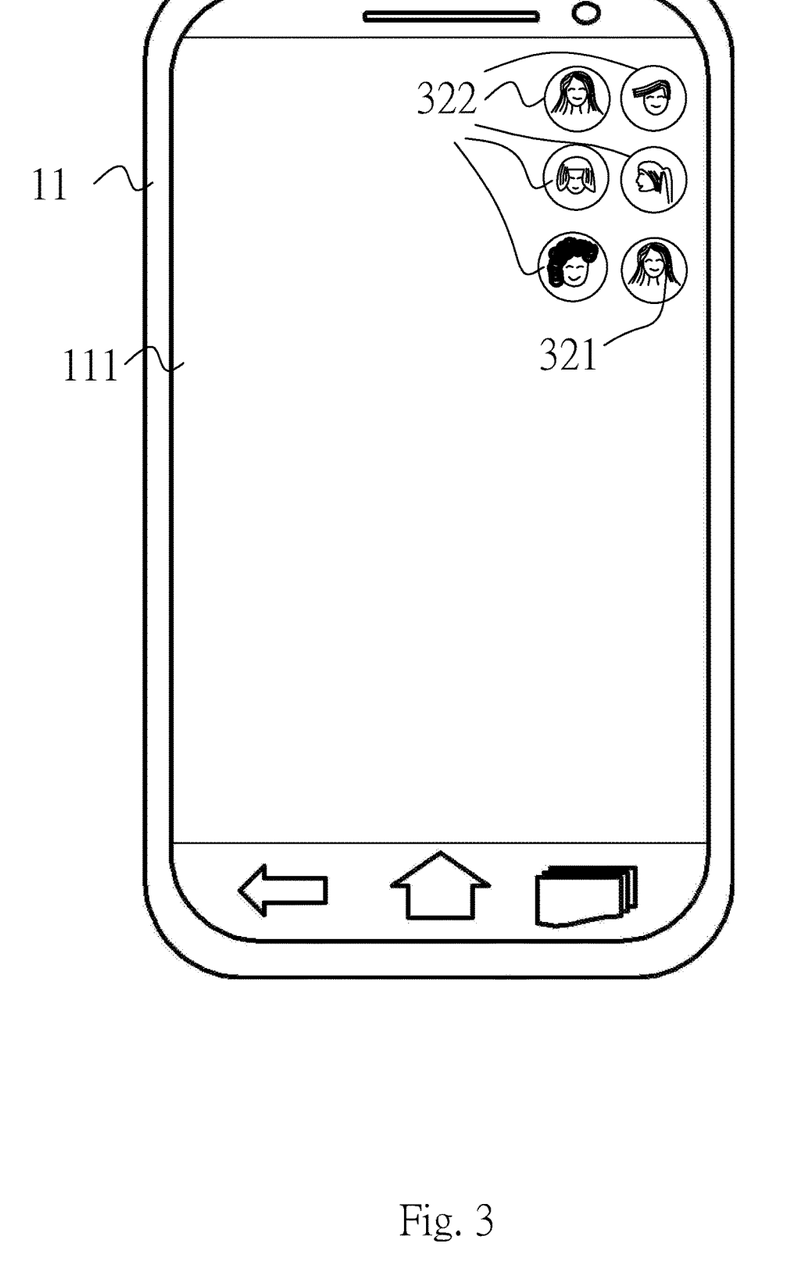
FIGS. 3 through 5 show schematic views of an intelligent communication device communicating with the system according to the method of the first embodiment.

In step 42, the server 121 searches the data storage device 122 for at least one online client (primary target client 321), who meets the exchange conditions provided by the requesting client 31. Also, the server 121 searches the data storage device 122 for a plurality of clients (false target clients 322) (for example: 5 clients), who meet the exchange conditions provided by the requesting client 31. In step 43, the server 121 sends the associated data (such as photos) of the primary target client 321 and the five false target clients 322 to the intelligent communication device 11 of the requesting client 31 so that the intelligent communication device 11 can simultaneously show six head portrait images or avatars (see FIG. 3) at the display screen 111. Also, the server 121 connects the primary target client 321 with the requesting client 31 through the intelligent communication device 11 of the requesting client 31, so that the primary target client 321 can communicate with the requesting client 31. Also, the requesting client 31 may purchase points from the server 121 for playing games or participating in an activity.

In this embodiment, the requesting client 31 is interpreted as a male, and thus the avatars of the primary target client 321 and the false target clients 322 shown on the display screen 111 of the intelligent communication device 11 are female. This means that the server 121 only informs the requesting client 31 of the primary target client 31 being among the six target clients; however, the requesting client 31 does not know which one of the six target clients is the primary target client 31. Therefore, in step 44, if one of the six avatars shown on the intelligent communication device 11 is pretty, the requesting client 31 is unlikely to reject the communication at once. Of course, the requesting client 31 has a right to cancel the communication at any time, or request the server 121 to replace the current primary target client 31 and to send a next primary target client together with a next group of false target clients.

Figure 4:
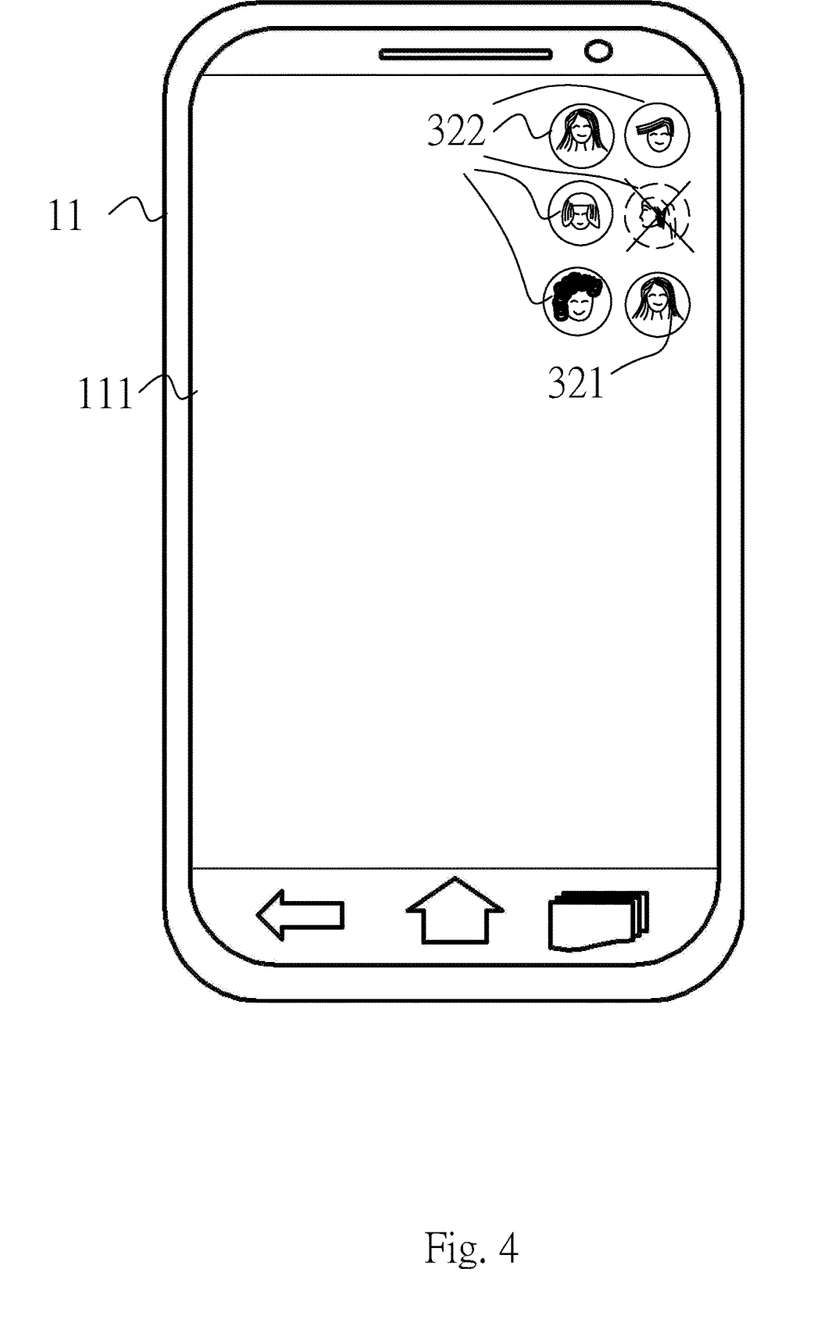

While the requesting client 31 continues communicating with the unknown primary client 321, the requesting client 31 may have a nice talk with the primary target client 321 and want to see the primary target client 321 right now. In step 45, the server 121 checks whether the requesting client 31 is entitled to get a delete privilege according to the time records stored in the data storage device 122, and the server 121 may remind the requesting client 31 to redeem the points unused by the requesting client 31. Alternatively, the server 121 may store the points unused by the requesting client 31 to the data storage device 122, or the server 121 may further grant the requesting client 31 one or more delete privileges corresponding to the points unused by the requesting client 31. Alternatively, the server 121 may confer a delete privilege to the requesting client 31 when the requesting client 31 participates an activity, such as celebration of Valentine's Day. Upon receiving a delete request from the requesting client 31 (see step 48), the server 121 will randomly delete one of the five false target clients 322 (see step 49). As such, the display screen 111 of the intelligent communication device 11 can be updated to show a total of five avatars (see FIG. 4). Thus, the requesting client 31 may approach the primary target client 321 in a shorter time.

In step 46, the server 121 checks whether the requesting client 31 in communication with the primary client 321 has reached a threshold of time, for example: 0.5 hour of communication; if the answer is "yes", the server 121 will grant the requesting client 31 a delete privilege. If the requesting client 31 has to stop the communication, due to an unexpected situation, before reaching the threshold of 0.5 hour, the server 121 will exit step 46 and proceed to step 44; on the other hand, if the requesting client 31 has reached the threshold of 0.5 hour in communication with the primary target client 321, the server 121 will grant the requesting client 31 a delete privilege (step 47). In step 48, the server 121 checks whether the requesting client 31 has sent a delete request; if the requesting client 31 does not send a delete request, the server 121 will save the unused delete privilege of the requesting client 31 to the data storage device 122, and then proceed to step 44; if the server 121 has received a delete request from the requesting client 31, the server 121 will execute step 49, wherein one of the false target clients 322 will be deleted, and then the server 121 will proceed to step 50, wherein the server 121 will check whether all of the false target clients 322 have been deleted; if yes, the requesting client 31 can make sure the identity of the primary target client 321 (see step 51); otherwise, the server 121 will proceed to step 44.

Figure 5:
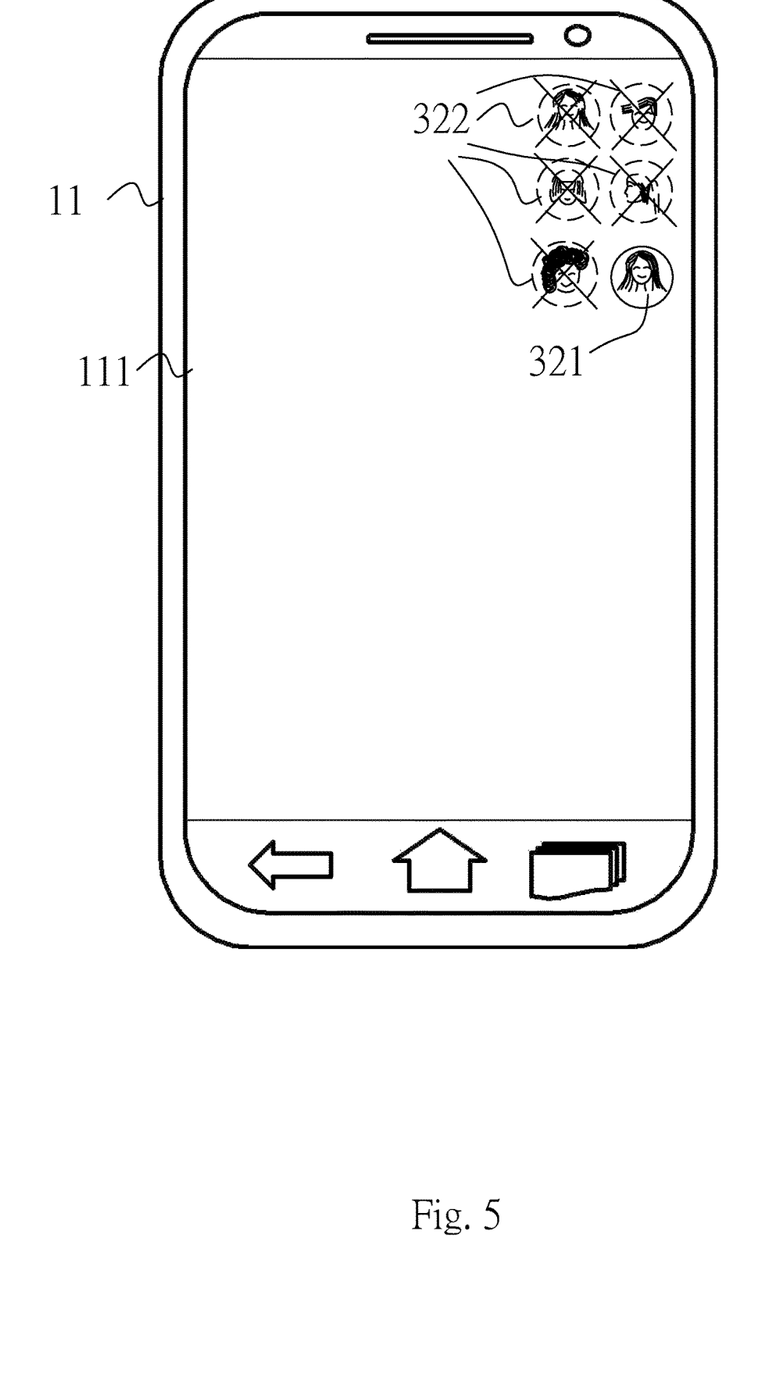

In this embodiment, since a client can be granted with up to two delete privileges per day, the requesting client 31 has to communicate with the primary target client 321 for three consecutive days to allow the server 121 to delete all of the avatars of the false target clients 322 by repeatedly executing steps 44 through 49, and thus the avatar of the primary target client 321 can be made known to the requesting client 31, as shown in FIG. 5. As such, although the appearance of the primary target client 321 may be not good, due to the requesting client 31 failing to confirm the identity of the primary target client 321 until all of the false target clients 322 have been deleted, both parties may achieve a certain degree of mutual understanding and have made a good impression on each other after a total of two hours of communication without giving up the opportunity of making friends. Thus, the system of the present invention can offer more equitable opportunities to users with ordinary appearance in making friends.

Figure 6:
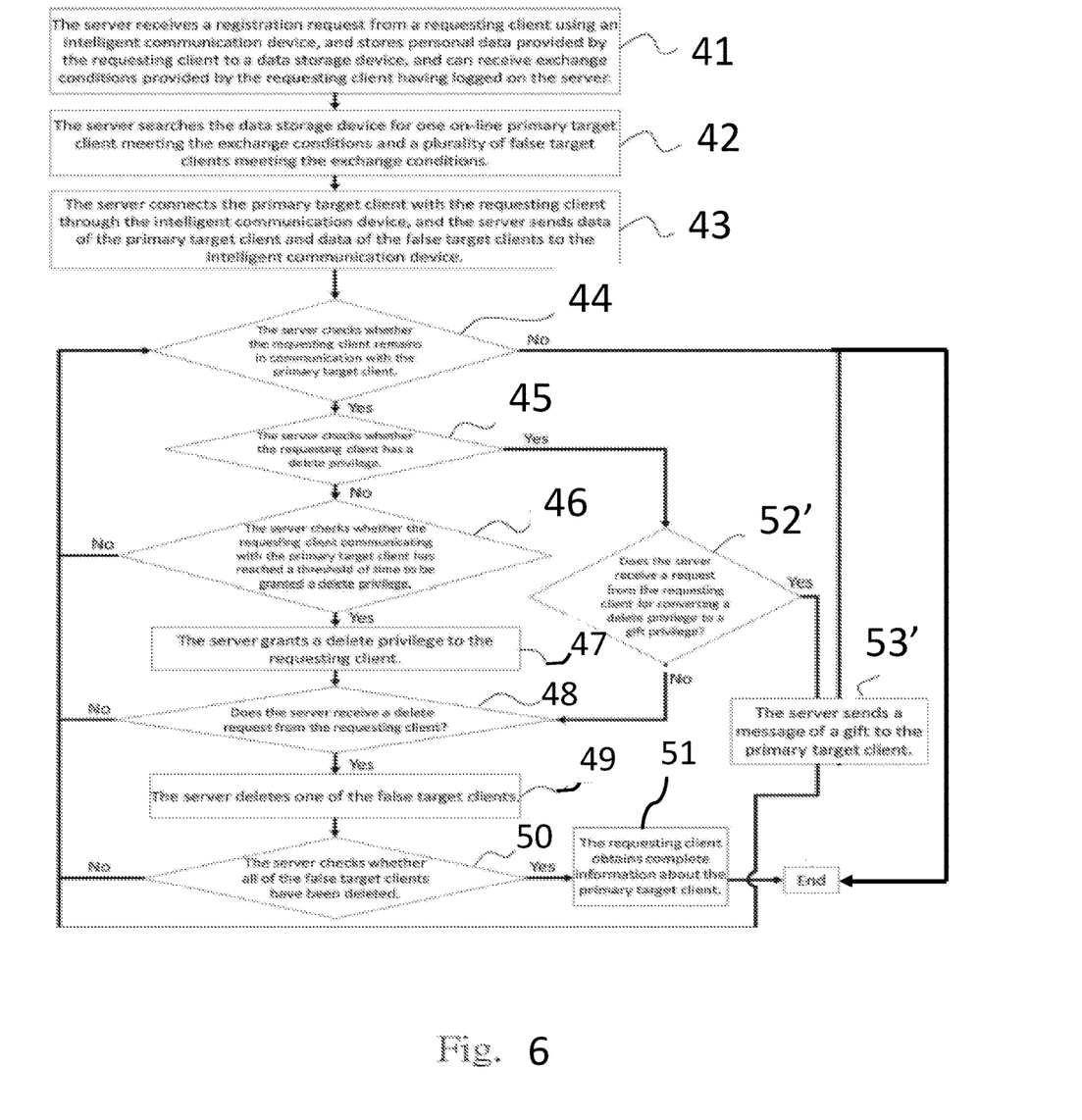
FIG. 6 shows a flowchart of the method according to a second embodiment of the present invention.

Of course, those skilled in the art can understand that two randomly paired persons do not necessarily get favor from each other, and furthermore, the time of communication between the two persons is not the only basis or standard on which the server 121 decides to grant a delete privilege to the requesting client. The following paragraphs will illustrate a second embodiment of the present invention, wherein the parts same as the first embodiment are omitted.

Unlike the first embodiment, there are two additional steps 52' and 53'. In step 52' and step 53', the server 121 can convert a delete privilege to a gift privilege and send a message of the associated gift to an intelligent communication device of the primary target client 321, after receiving a conversion request from the requesting client 31.

The above embodiments are used for illustrating the technical contents of the present invention, but not for limiting the scope of the present invention. The system and method of the present invention can have various modifications. As an example, after a requesting client has conducted information exchange with a primary target client and leaves the system, if the requesting client logs on the system on the next day for communicating with the same primary target client, the server may give a reward to the requesting client. As another example, when the information exchange between both parties reaches a level, the server may provide a game for them, wherein a graphic interface of the game can be sent to the display screen of the intelligent communication device of each client, and allows them to collaborate with each other to win the game. As a further example, when either client does not want to continue the information exchange, the server can give each of the two parties a right to replace the counterpart. As a still further example, the server can be provided with a statistical unit to calculate the count of information exchange of the requesting client communicating with the primary target client, and the count can be converted into a corresponding emotion symbol and send the symbol to the display screens of the intelligent communication devices of both parties.

With the method of the present invention, the requesting client cannot ensure which one of the photos is the real target client being communicated during a communication activity, so that users inclined to select their counterparts by appearance, can be avoided.

While the invention has been described with reference to the preferred embodiments above, it should be recognized that the preferred embodiments are given for the purpose of illustration only and are not intended to limit the scope of the present invention and that various modifications and changes, which will be apparent to those skilled in the relevant art, may be made without departing from the spirit and scope of the invention.

What is claimed is:

1. A method of two-way information exchange for a system including information exchange processing equipment which includes at least one data storage device and at least one server connected with the data storage device, the method comprising:
   (a) receiving a connection request and exchange conditions from a requesting client using a communication device with a display screen;
   (b) searching the data storage device for at least one online client, known as a primary target client, according to the exchange conditions, and searching the data storage device for a plurality of clients, known as false target clients, according to the exchange conditions;
   (c) connecting the primary target client with the requesting client through the communication device to start a communication activity, and sending data of the primary target client and data of the false target clients to the communication device of the requesting client;
   (d) granting the requesting client a delete privilege when the requesting client communicating with the primary target client reaches a threshold of time;
   (e) deleting at least one of the false target clients and then sending data of the remaining false target clients and data of the primary target client to the communication device of the requesting client when receiving a delete request from the requesting client; and
   (f) terminating the communication activity upon receiving a request from the requesting client or the primary target client.

2. The method of claim 1, further comprising step (g) before step (a), which is: (g) storing personal data provided by clients, including the requesting client, the primary target client and the false target clients, to the data storage device for registration.

3. The method of claim 1, further comprising step (f1) after step (f), which is:
   (f1) receiving a request from the requesting client who seeks to continue communicating with the primary target client of step (b) to start a next communication activity.

4. The method of claim 3, further comprising step (f2) after step (f1), which is:
   (f2) granting the requesting client a game privilege, and sending a graphic interface of the game to the display screen of the communication device of the requesting client and a display screen of a communication device of the primary target client after receiving a request of playing a game from the requesting client, whereby the requesting client collaborates with the primary target client to win the game.

5. The method of claim 1, further comprising step (i) between step (d) and step (e), which is: (i) granting the requesting client at least one replacement privilege, and replacing the primary target client by another client and re-executing step (d) when receiving a replacement request from the requesting client.

6. The method of claim 1, wherein, in step (d), the server may grant the requesting client a gift privilege.

7. A system for making friends, comprising:
   at least one communication device having at least one display screen; and
   information exchange processing equipment, which includes:
      at least one data storage device capable of storing data provided from a plurality of clients, and
      at least one server connected with the data storage device, the server capable of receiving exchange conditions provided from a requesting client using the communication device to search for at least one online client, known as a primary target client, according to the exchange conditions, and to search for a plurality of clients, known as false target clients, according to the exchange conditions, the server connecting the primary target client with the requesting client through the communication device of the requesting client, and sending data of the primary target client and data of the false target clients to the communication device of the requesting client; wherein the server grants the requesting client a delete privilege when the requesting client communicating with the primary target client reaches a threshold of time, the server deletes at least one of the false target clients, and the server sends data of the remaining false target clients and data of the primary target client to the communication device of the requesting client when receiving a delete request from the requesting client.

8. The system of claim 7, wherein the server includes a statistical unit capable of calculating the count of information exchange of the requesting client communicating with the primary target client, and the server is capable of sending a symbol corresponding to the count of information exchange to the communication device of the requesting client.

* * * * *